United States Patent
Yang

(10) Patent No.: US 12,264,210 B2
(45) Date of Patent: Apr. 1, 2025

(54) ENDODONTIC BODIES, SYSTEMS AND METHODS FOR MAKING ENDODONTIC BODIES, AND METHODS OF USING ENDODONTIC BODIES

(71) Applicant: Innovative BioCeramix Inc., Burnaby (CA)

(72) Inventor: Quanzu Yang, Burnaby (CA)

(73) Assignee: Innovative BioCeramix, Inc., Burnaby (CA)

( * ) Notice: Subject to any disclaimer, the term of this patent is extended or adjusted under 35 U.S.C. 154(b) by 29 days.

(21) Appl. No.: 17/930,700

(22) Filed: Sep. 8, 2022

(65) Prior Publication Data

US 2023/0113910 A1    Apr. 13, 2023

Related U.S. Application Data

(60) Provisional application No. 63/360,144, filed on Sep. 9, 2021.

(51) Int. Cl.
*A61C 5/50* (2017.01)
*C08F 136/06* (2006.01)
*C08F 136/08* (2006.01)

(52) U.S. Cl.
CPC .......... *C08F 136/08* (2013.01); *C08F 136/06* (2013.01)

(58) Field of Classification Search
CPC ...................................... A61C 5/50
See application file for complete search history.

(56) References Cited

FOREIGN PATENT DOCUMENTS

| CN | 210308900 U | | 4/2020 |
|---|---|---|---|
| CN | 113133840 A | * | 7/2021 |
| CN | 113133840 B | | 1/2022 |
| WO | 2023035077 A1 | | 3/2023 |

OTHER PUBLICATIONS

Machine Translation CN 113133840A1 (Year: 2021).*
Hauman et al., "Biocompatibility of dental materials used in contemporary endodontic therapy: a review. Part 2. Root-canal-filling materials," Int. Endod. J., 36, 147-160, 2003. (Year: 2003).*
International Searching Authority, Written Opinion of the International Searching Authority, Dec. 15, 2022, 11 pages.

* cited by examiner

*Primary Examiner* — Catherine S Branch
(74) *Attorney, Agent, or Firm* — Schacht Law Office, Inc.; Michael R. Schacht

(57) ABSTRACT

Disclosed is a method of making an endodontic body in which a filling material blank comprising filling material suitable for endodontic applications is provided, a mold system defining at least one mold cavity is provided, where at least a portion of the mold cavity is in the shape of the endodontic body, the filling material blank is arranged adjacent to the at least one mold cavity, heat is applied to the filling material blank such that the filling material blank is deformable; and pressure is applied to the heated filling material blank such that at least a portion of the heated material blank flows into the at least one mold cavity.

18 Claims, 16 Drawing Sheets

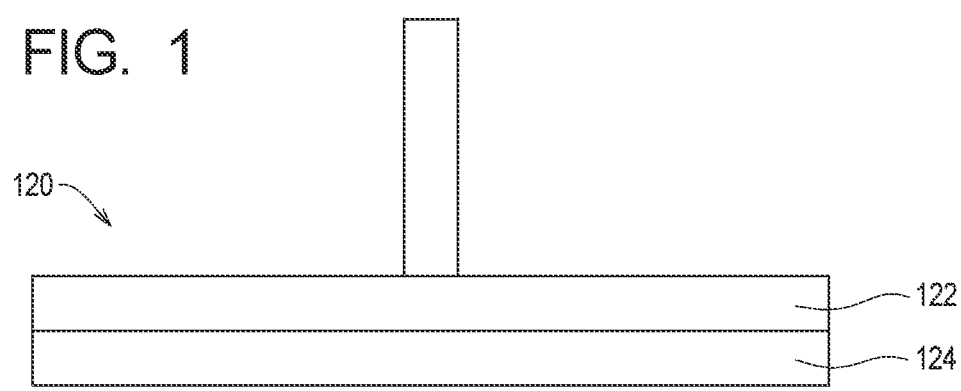
FIG. 1
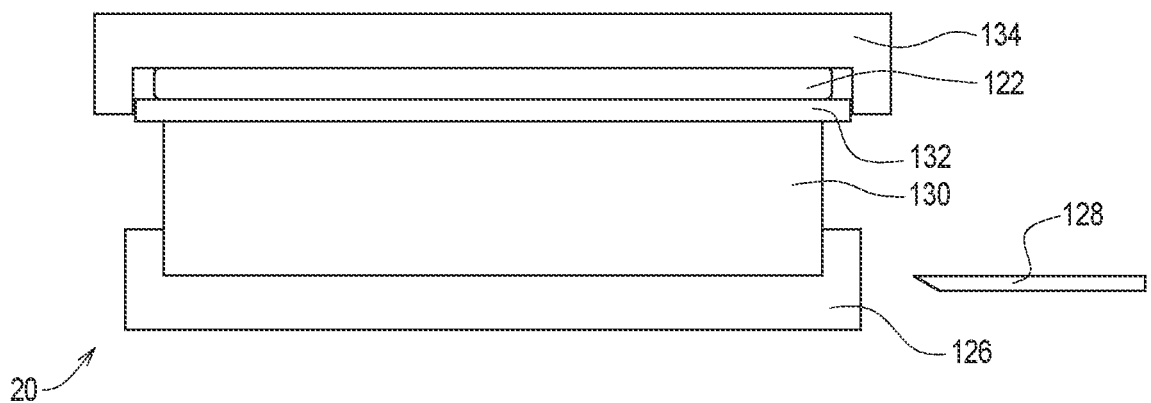

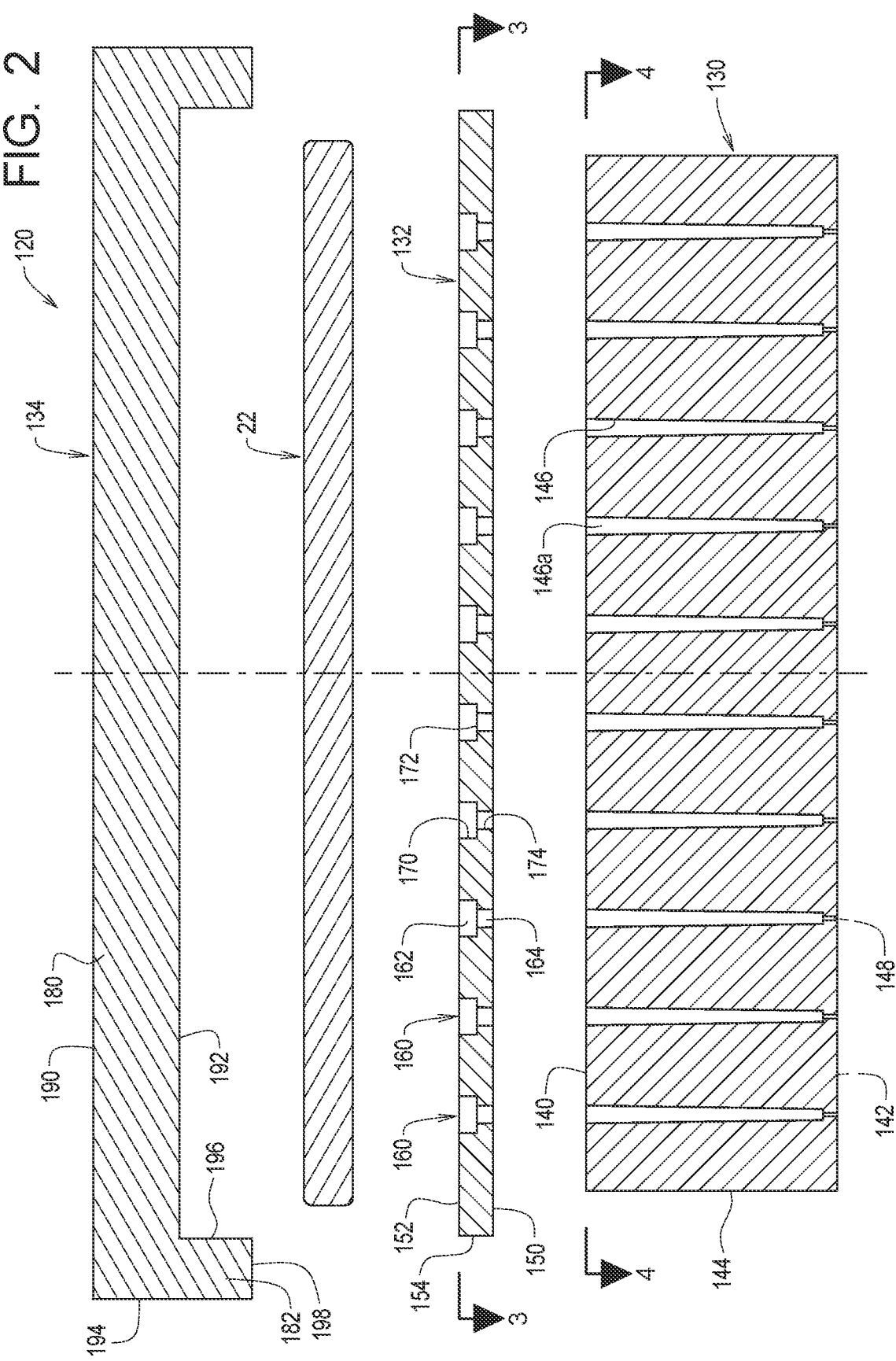

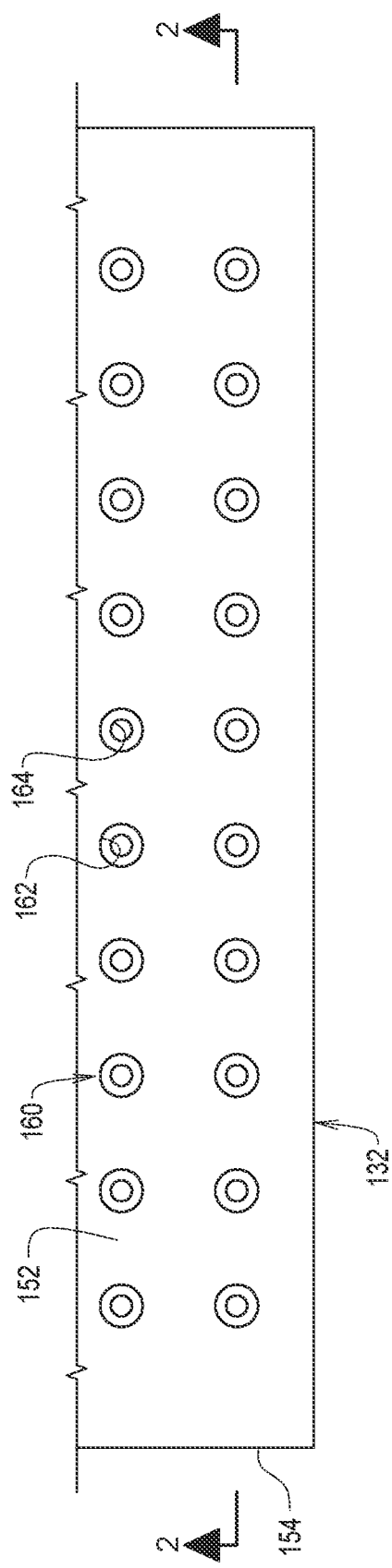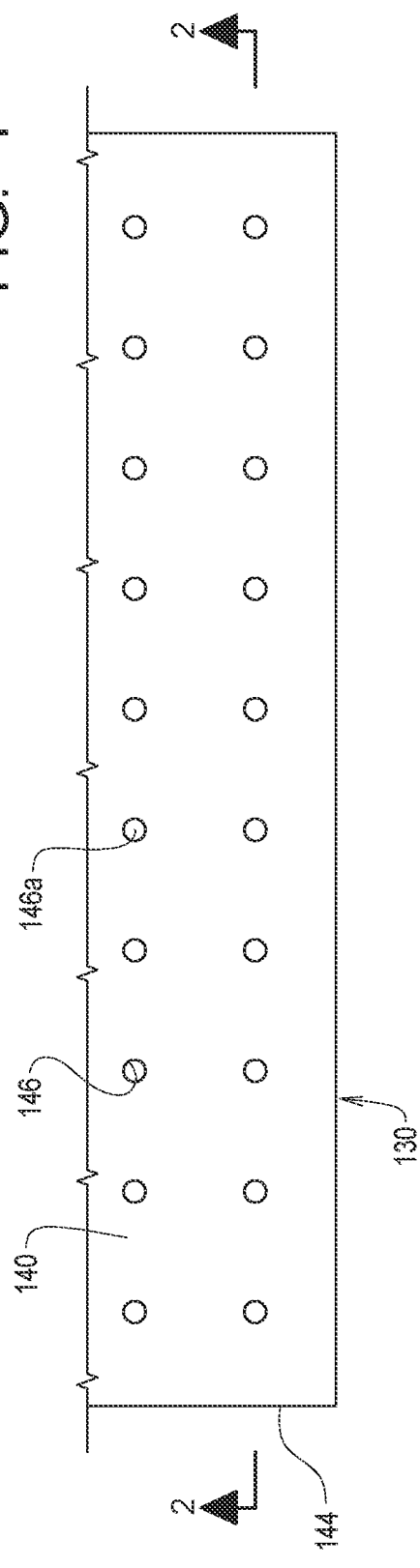

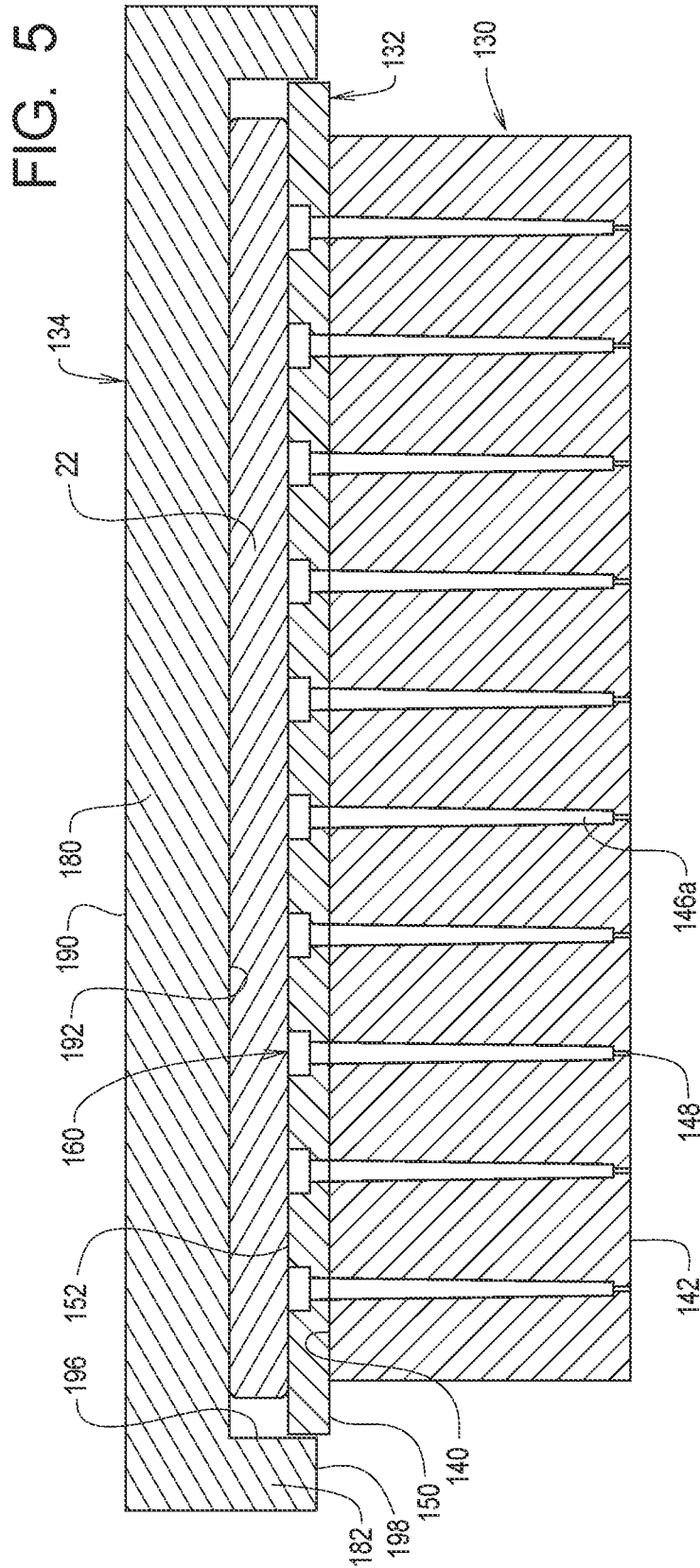

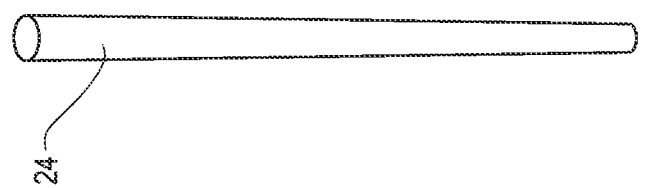
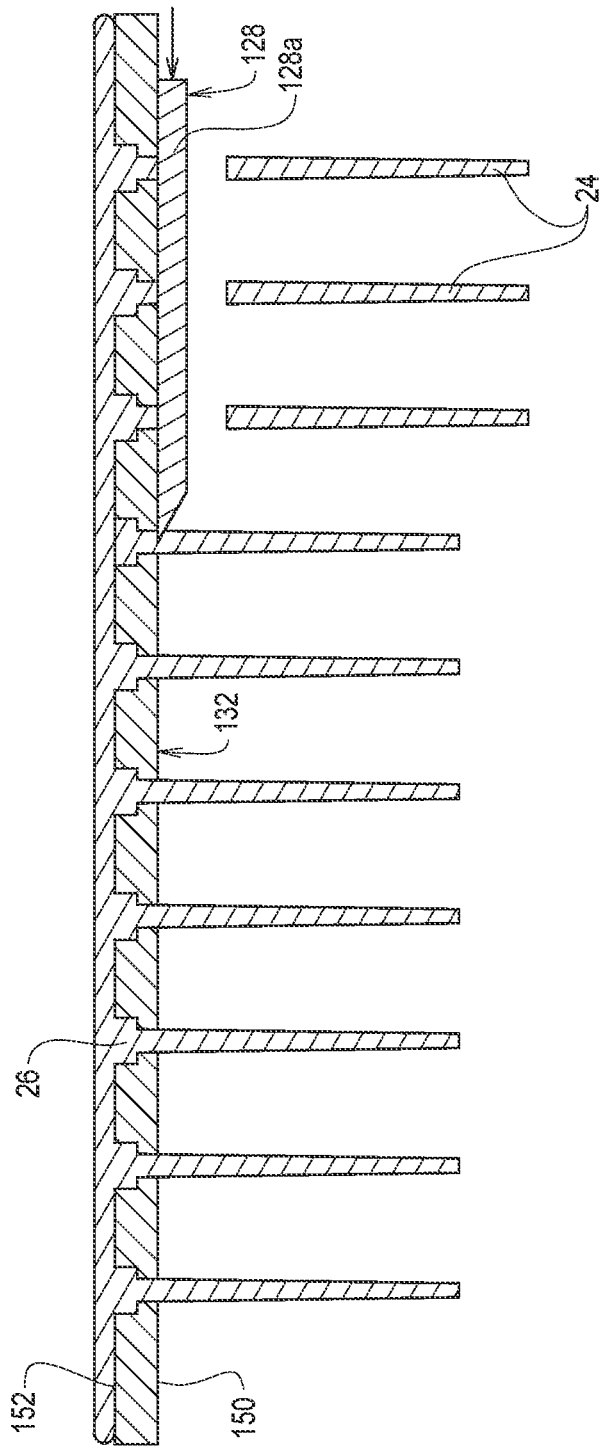

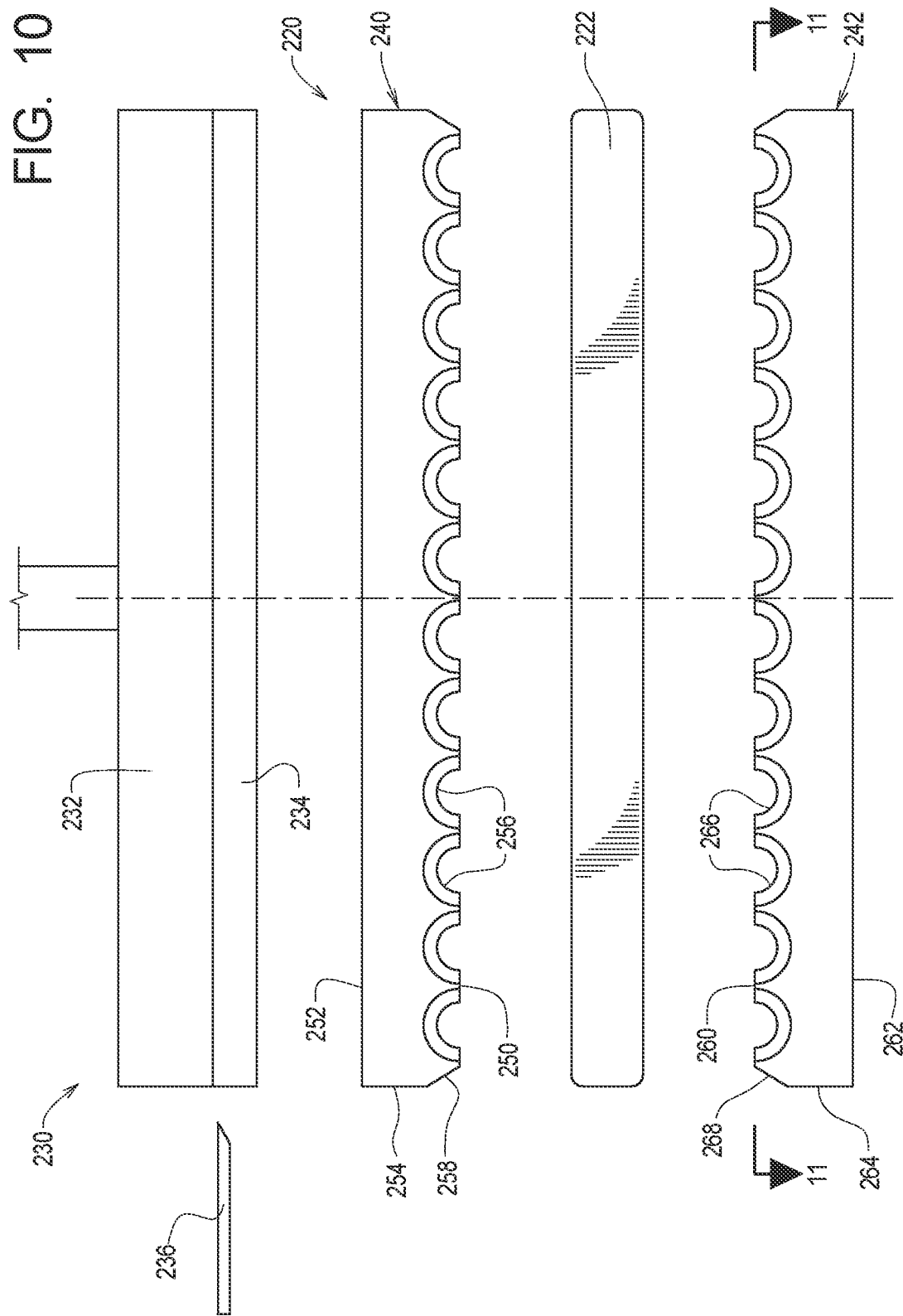

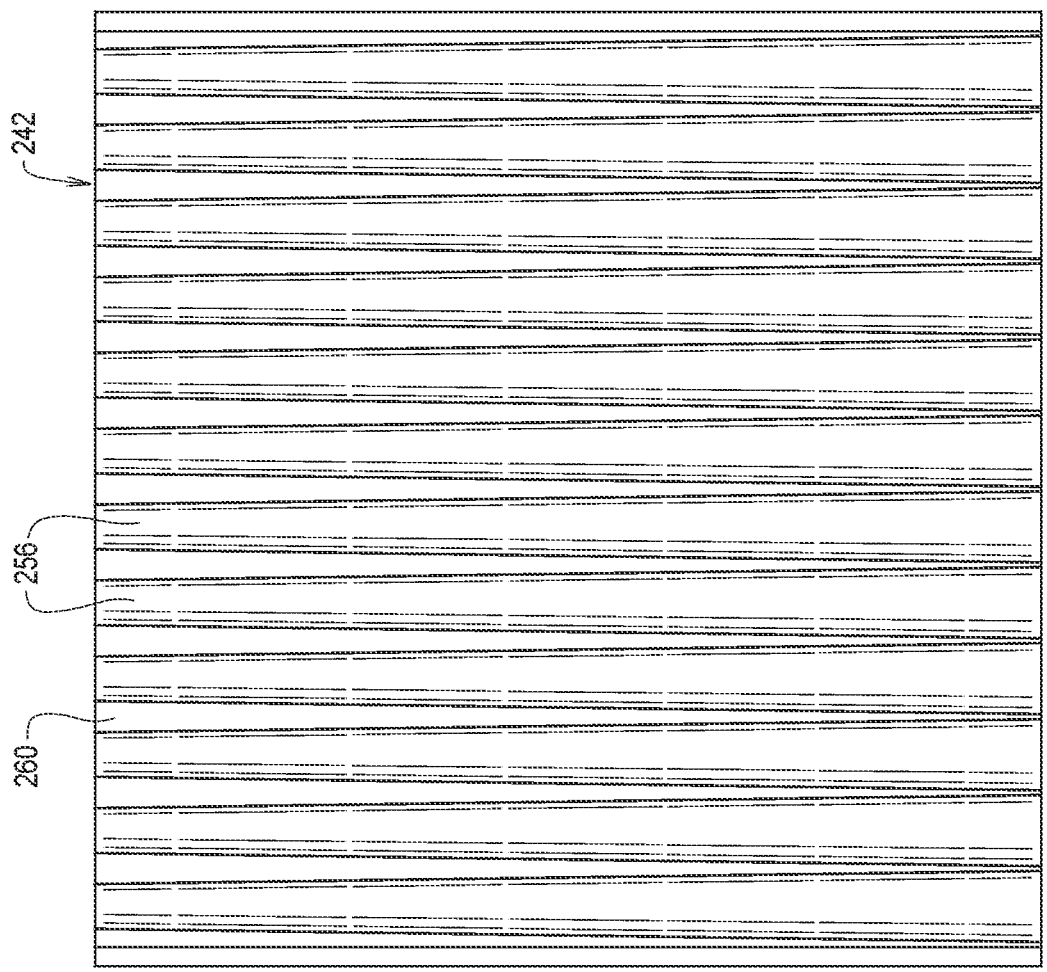

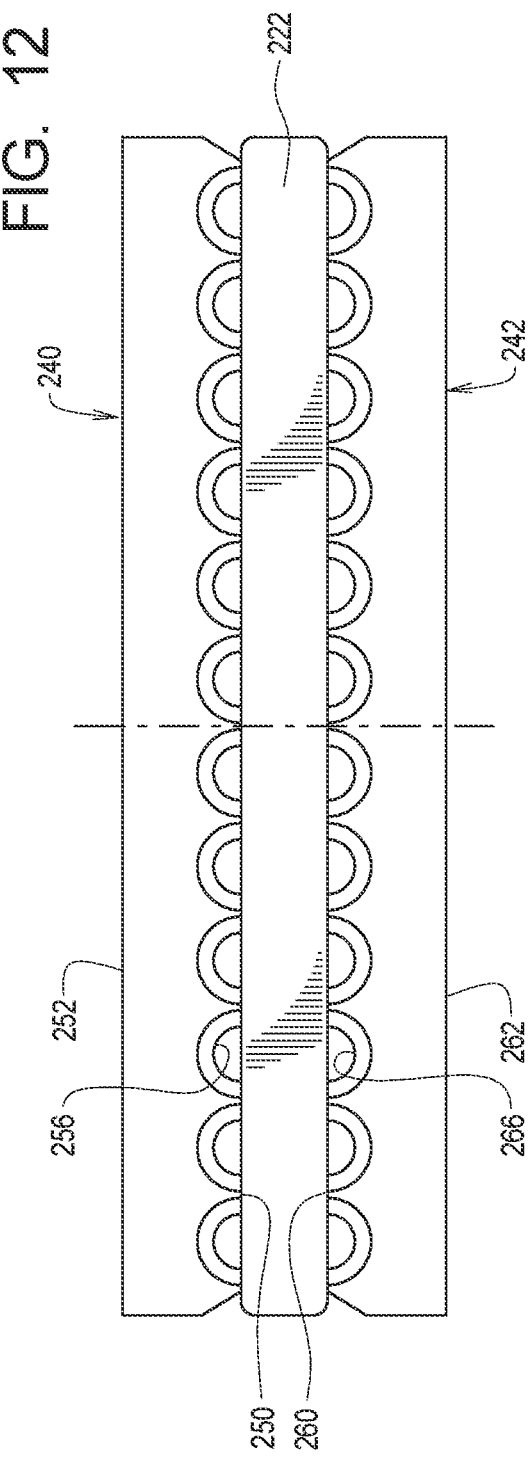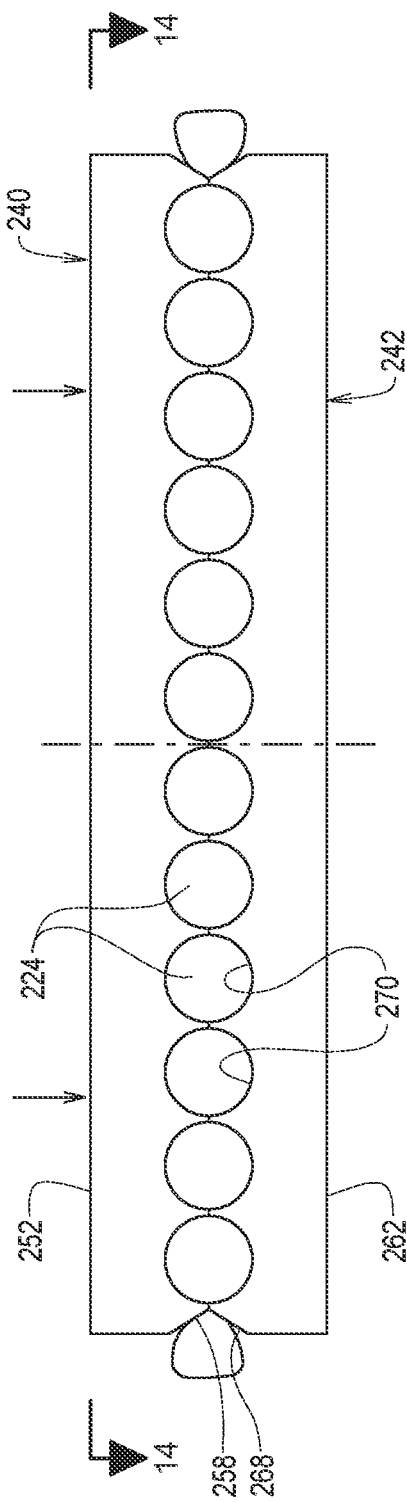

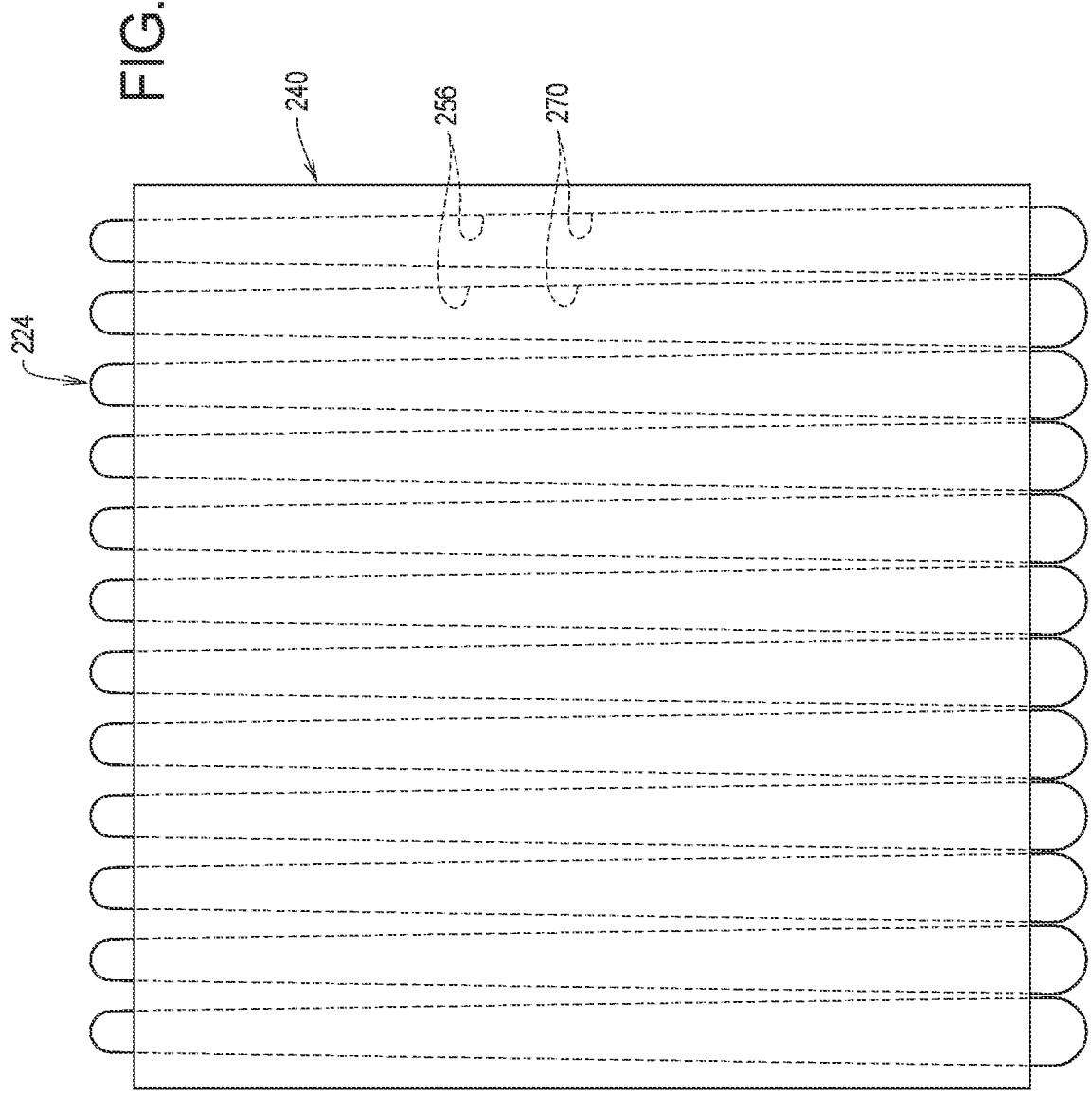

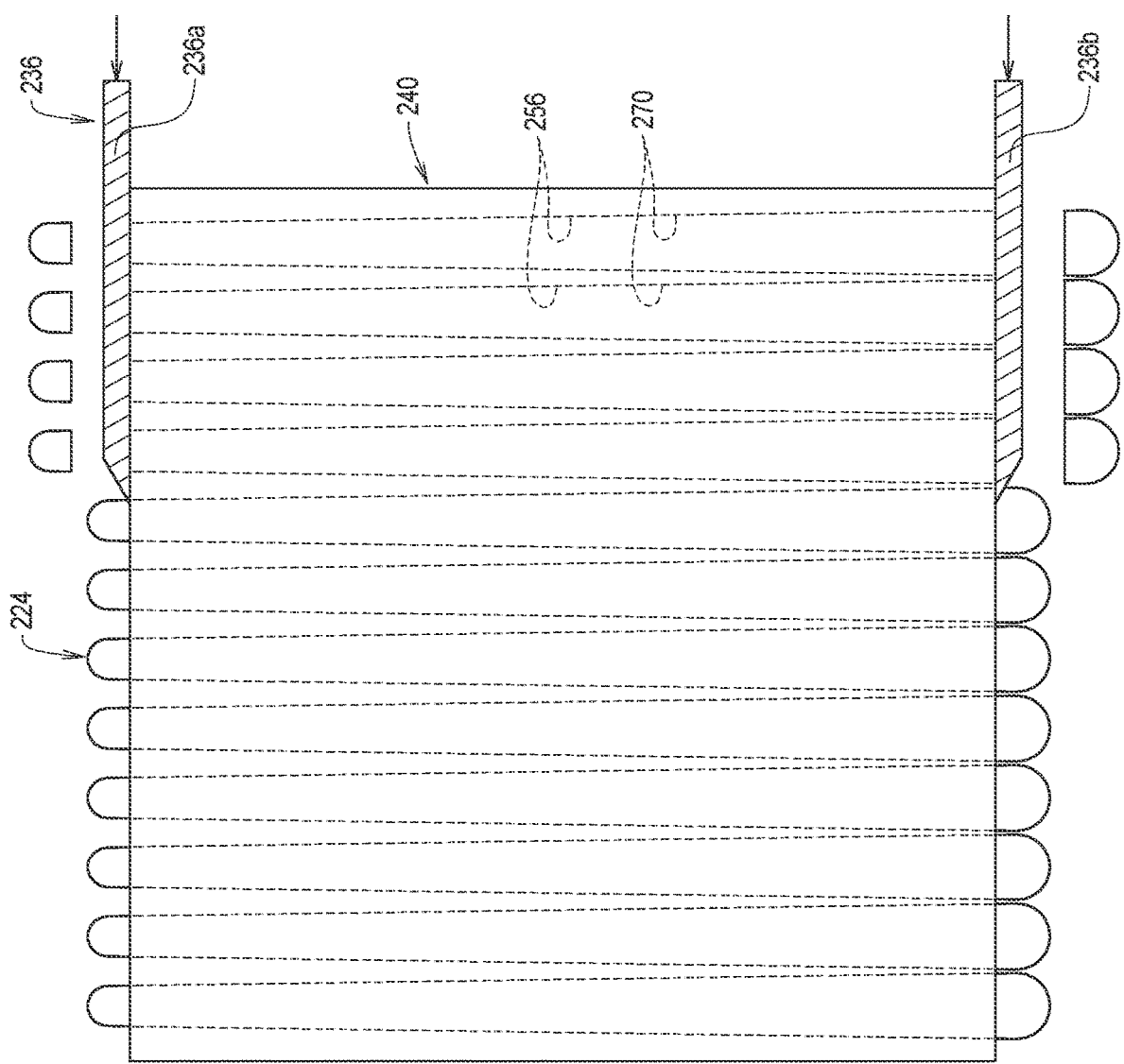

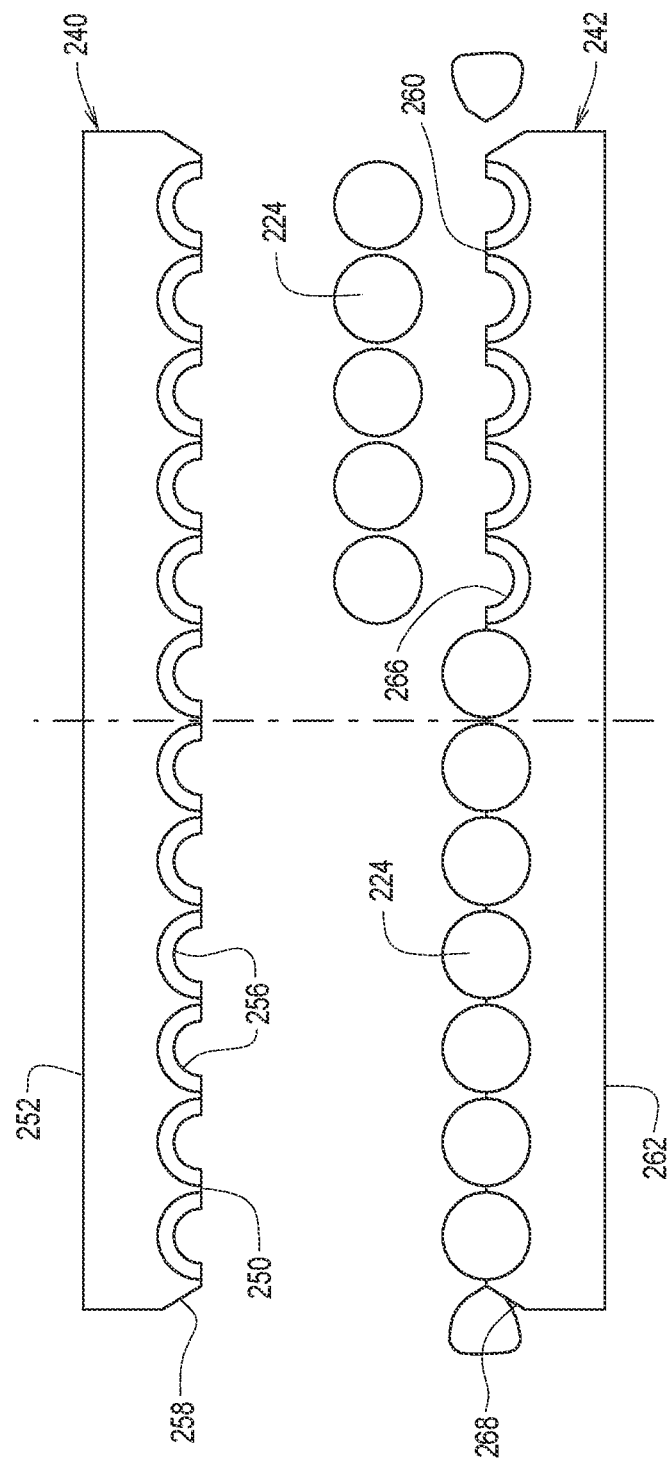

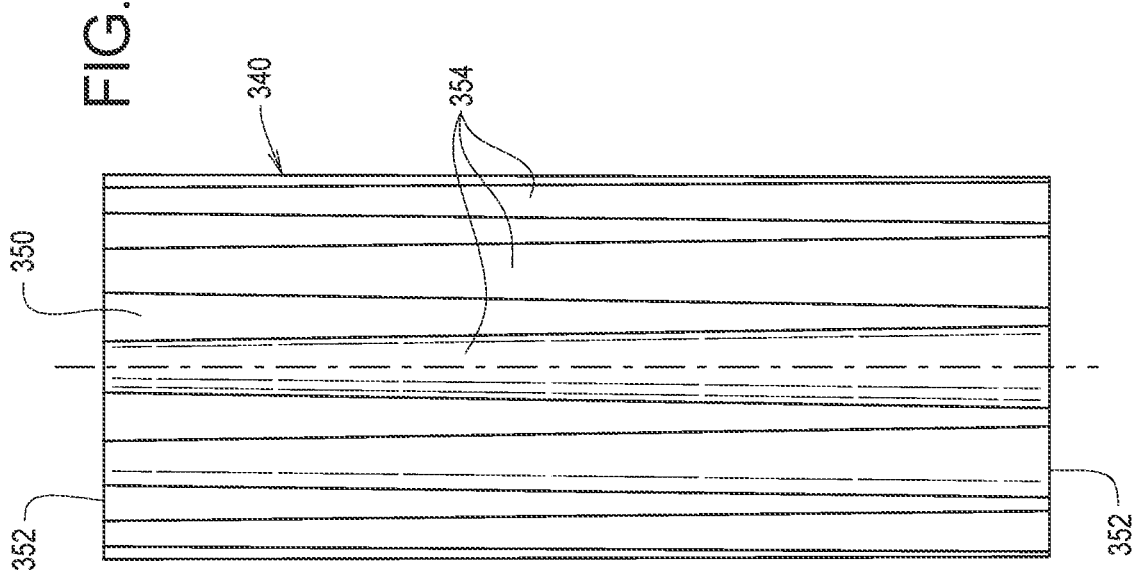

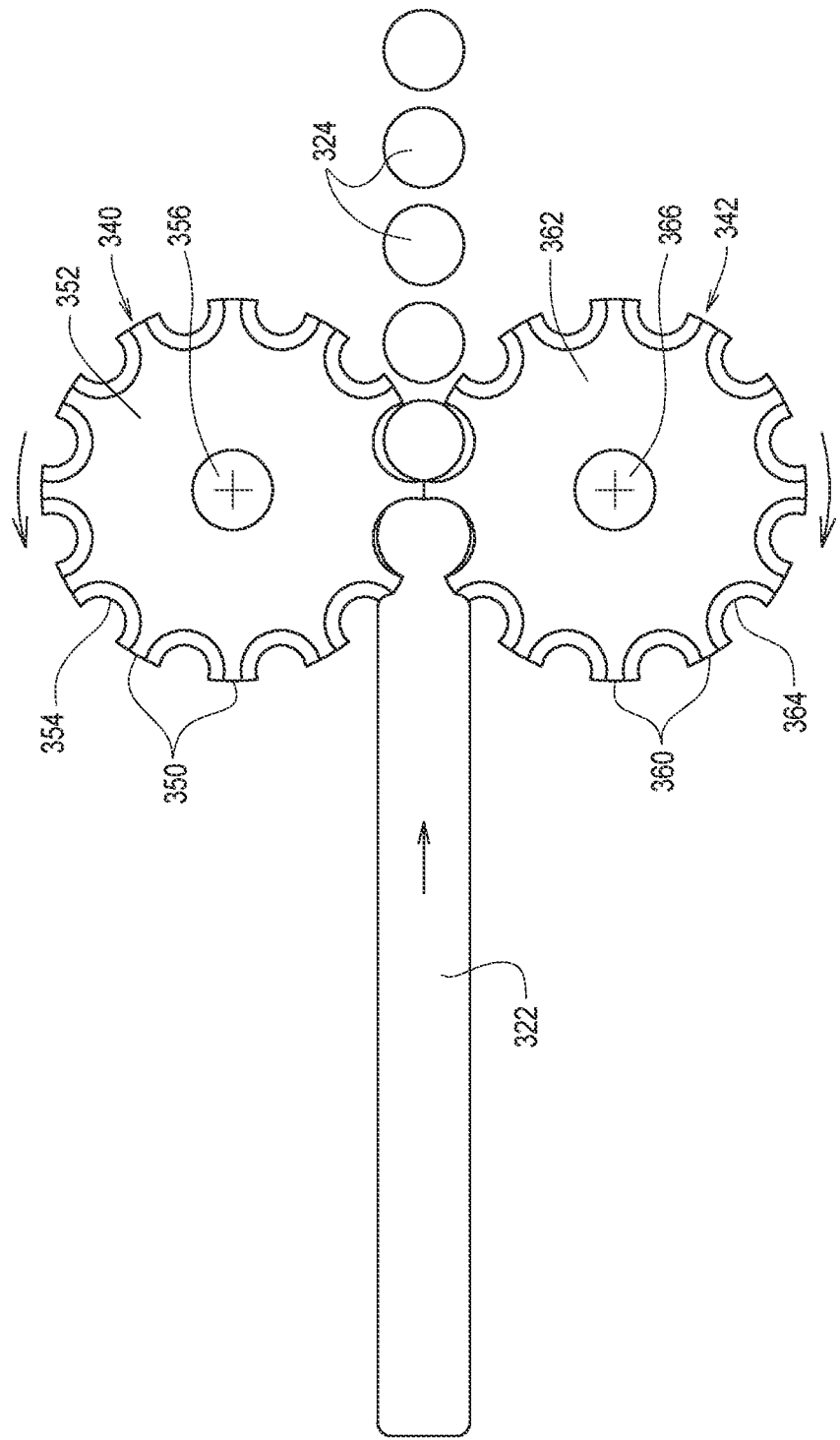

ENDODONTIC BODIES, SYSTEMS AND METHODS FOR MAKING ENDODONTIC BODIES, AND METHODS OF USING ENDODONTIC BODIES

RELATED APPLICATIONS

This application, U.S. application Ser. No. 17/930,700 filed Sep. 8, 2022, claims benefit of U.S. Provisional Application Ser. No. 63/360,144 filed Sep. 9, 2021, the contents of which are incorporated herein by reference.

TECHNICAL FIELD

The present invention disclosed a novel systems and methods for making bodies for endodontic treatment and the use of such endodontic bodies.

BACKGROUND

Gutta-percha is a plastic substance from the percha tree. Gutta-percha is commonly used as a permanent filling for a tooth after endodontic dental procedures and, in particular, after root canal procedures. In particular, gutta-percha is heated and compressed into the empty canal after the damaged portion of the tooth is removed from the tooth canal. The canal is then sealed with adhesive cement. The present invention may be used in a variety of dental procedures but is of particular significance when used in conjunction with root canal procedures, and that application of the invention will be described herein in detail.

Inert materials in addition to or instead of gutta-percha may be used to form a filling material for empty root canals. Materials for use as an endodontic filing are typically antiseptic and sold in a conical body commonly referred to as a "point." The shape and dimensions of the point generally conform to the shape of the empty root canal to facilitate arrangement of the filling material into the empty root canal. The term "endodontic body" will be used herein to refer to pure gutta-percha endodontic points, endodontic points comprising gutta-percha in combination with other materials, and materials appropriate for endodontic procedures that do not include gutta-percha.

The need exists for improved systems and methods for fabricating endodontic bodies and improved endodontic bodies for use in endodontic procedures.

RELATED ART

Conventional gutta-percha endodontic filling points contain approximately 20% gutta-percha (matrix), 66% zinc oxide (filler), 11% heavy metal sulfates (radiopacifier), and 3% waxes and/or resins (plasticizer). The mechanical properties conventional gutta-percha endodontic filling points were indicative of a partially crystalline viscoelastic polymeric material (see, e.g., "Composition and mechanical properties of gutta-percha endodontic points" by Friedman C M, Sandrik J L, Heuer M A, Rapp G W. J Dent Res; 1975 September-October; 54 (5): 921-). Gutta Percha cones are conventionally made by a hand-rolling process.

U.S. Patent Application Publication No. US20140315155A1 to Li et al discloses the process for making gutta percha cones using an injection molding process. In particular, this reference discloses a method of making a cone for a dental root canal filling was performed by injecting material into the cavity in the mold, and the mold is a split mold. Also, the split mold comprise a first mold halve and a second mold halve, each defining a chamber having surface features corresponding to one half of a cone to be molded, so that when the first and second mold halves are mated together, the cavity is formed. The limitation for the process in US20140315155A1 is that conventional gutta-percha endodontic materials may not have sufficiently flowability. Another disadvantage of the process described in US20140315155A1 is the split mold process limits production speed.

SUMMARY

The present invention may be embodied as a method of making an endodontic body comprising the following steps. A filling material blank comprising filling material suitable for endodontic applications is provided. A mold system defining at least one mold cavity is provided, where at least a portion of the mold cavity is in the shape of the endodontic body. The filling material blank is arranged adjacent to the at least one mold cavity. Heat is applied to the filling material blank such that the filling material blank is deformable. Pressure is applied to the heated filling material blank such that at least a portion of the heated material blank flows into the at least one mold cavity.

The present invention may also be embodied as a mold system for making an endodontic body from a filling material blank comprising filling material suitable for endodontic applications comprising at least one mold member defining at least a portion of a mold cavity. At least a portion of the mold cavity is in the shape of the endodontic body. When the filling material blank is arranged adjacent to the at least one mold cavity and heat is applied to the filling material blank such that the filling material blank is deformable, pressure is applied to the heated filling material blank such that at least a portion of the heated material blank flows into the at least one mold cavity.

The present invention may also be embodied as an endodontic body forming system for making an endodontic body from a filling material blank comprising filling material suitable for endodontic applications comprising a mold system, a press system, and a heating system. The mold system comprises at least one mold member defining at least a portion of a mold cavity, where at least a portion of the mold cavity is in the shape of the endodontic body. When the filling material blank is arranged adjacent to the at least one mold cavity, the heat system applies heat to the filling material blank such that the filling material blank is deformable. When the filling material blank is heated, the press system applies pressure to the heated filling material blank such that at least a portion of the heated material blank flows into the at least one mold cavity.

The present invention may thus be embodied as a novel process for making high density plastic/ceramic endodontic bodies. In one example, a demolding layer is arranged on a mold block. A composite of filling material, typically comprising plastic/ceramic materials, is placed on a surface of the demolding layer, and thermo-pressure up to 2000 ton is applied to press the filling material into mold cavities defined by the mold. Optionally, a vacuum system may be used for removing the air from the mold and reduce pores in filling material. The demolding process may include the step of cooling the mold, and then lifting the demolding layer from the surface of the mold. The high density of plastic/ceramic endodontic body will provide better filling and sealing properties and high radiopacity for endodontic treatment.

BRIEF DESCRIPTION OF THE DRAWINGS

FIG. 1 is a somewhat schematic view of a first example endodontic body forming system;

FIG. 2 is an exploded side elevation section view corresponding to lines 2-2 in FIGS. 3 and 4 of a first example mold system that may be used by the first example endodontic body forming system;

FIG. 3 is a plan view taken along lines 3-3 in FIG. 2 of an example separation plate used by the first example mold system;

FIG. 4 is a plan view taken along lines 4-4 in FIG. 2 of an example mold block used by the first example mold system;

FIGS. 5-8 are side elevation section views similar to FIG. 2 illustrating a first example method of forming endodontic bodies using the first example mold system;

FIG. 9 is a perspective view of an example endodontic body formed by the first example mold system using the first example method;

FIG. 10 is a side elevation view illustrating a second example mold system of the present invention;

FIG. 11 is a plan view taken along lines 11-11 in FIG. 10 of an example mold block that may be used by the second example mold system;

FIGS. 12 and 13 are side elevation views illustrating a first step of a second example method of forming endodontic bodies using the second example mold system;

FIG. 14 is a plan view taken along lines 14-14 in FIG. 13;

FIG. 15 is a plan view similar to FIG. 14 illustrating a second step of the second example method;

FIG. 16 is a side elevation view illustrating a third step of the second example method;

FIG. 18 is a plan view taken along lines 18-18 in FIG. 17; and

FIG. 19 is a side elevation view illustrating the third example mold system of the present invention in a second position.

DETAILED DESCRIPTION

Figure 6:
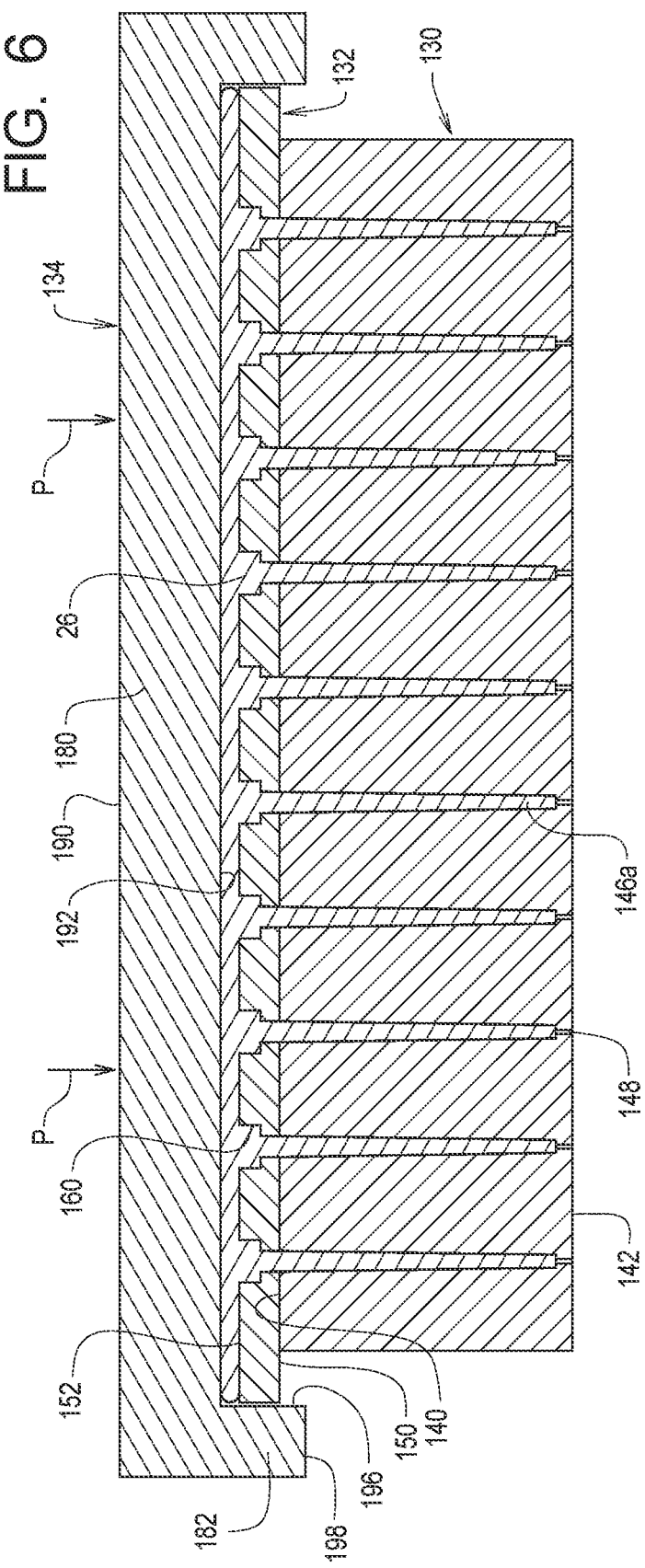

The present invention may be embodied in several different forms, and a number of different forms of the invention will be described below.

I. First Example System and Method for Fabricating Endodontic Bodies

Referring initially to FIGS. 1-8 of the drawing, depicted at 20 therein is a first example endodontic body fabricating system constructed in accordance with, and embodying, the principles of the present invention. The first example endodontic body fabricating system 20 processes a filing material blank 22 (FIGS. 1, 2, and 5) into one or more endodontic bodies 24 (FIG. 9) as shown in FIGS. 5-8. An intermediate molded body 26 (FIGS. 7 and 8) may be formed during the process of fabricating the endodontic body(s) 24.

As shown in FIG. 1, the first example endodontic body fabricating system 20 comprises a mold system 120, a press system 122, a heat system 124, an optional vacuum system 126, and an optional trimming system 128. The example press system 122, example heat system 124, example trimming system 126, and example vacuum system 126 are or may be conventional and will be described herein only to that extent helpful to a complete understanding of the present invention.

As will be described in more detail below, the example press system 122 is arranged to apply a force on the mold system 120, and the example heat system 124 is arranged to apply heat to the mold system 120. The vacuum system 126 is arranged to withdraw air from the mold system 120. The trimming system 128 is arranged to process an intermediate molded body 26 to obtain the endodontic bodies 24.

Turning now to FIG. 2 of the drawing, the example mold system 120 will be described in further detail. The example mold system 120 comprises a mold block 130, a demolding plate 132, and a transfer plate 134.

The example mold block 130 defines a proximal surface 140, a distal surface 142, at least one edge surface 144, and at least one mold surface 146. Each mold surface 146 defines a mold cavity 146a. The example mold cavities 146a may take many shapes but, for the purpose of forming the endodontic body depicted in FIG. 9, takes a generally conical shape with a blunted tip. In conical form, the example mold cavities 146a are symmetrical about a longitudinal axis of the mold cavities 146a.

In the example mold block 130, fluid ports 148 are formed in the mold block 130 between the mold surface 146 and the distal surface 142. Further, the example fluid ports 148 extend from a portion of each mold surface 146 farthest from the proximal surface 140 and closest to the distal surface 142 to allow fluid communication between the mold cavities 146a and the exterior of the mold block 130. If the optional vacuum system 126 is used, the vacuum system 126 is configured to remove air from the mold cavities 146a through the fluid ports 148.

The example demolding plate 132 defines a press surface 150, a support surface 152, and at least one edge surface 154. At least one through opening 160 is formed in the demolding plate 132. Each through opening 160 extends between the press surface 150 and the support surface 152 and defines a first through opening portion 162 and a second through opening portion 164. In particular, each through opening 160 is defined by a first opening surface 170, a second opening surface 172, and a third opening surface 174. The first, second, and third opening surfaces 170, 172, and 174 are sized and dimensioned such that, along a longitudinal axis of the through opening 160, a cross-sectional area of the first through opening portion 162 is greater than a cross-sectional area of the second through opening portion 164 in planes perpendicular to the longitudinal axis of the through opening 160.

To facilitate fabrication of the mold block 130 and the demolding plate 132, the example mold cavities 146a are conical and the example through openings 160 take the form of two coaxially aligned cylinders. In that context, the first opening surface 170 is cylindrical and defines a first radius, the second opening surface 172 is annular, and the third opening surface 174 is cylindrical and defines a second radius. The first radius is greater than the second radius such that the cross-sectional area of the first through opening portion 162 is greater than the cross-sectional area of the second through opening portion 164 as generally described above. The mold cavities 146a and the through openings 160 may thus be formed by standard subtractive milling operations using rotating tools. Alternatively, the mold block 130 and demolding plate 132 may be cast or 3D printed, in which case the shapes of the mold cavities 146a and through openings 160 in cross-section along their respective longitudinal axes may take other forms (e.g., rectangular or triangular cross-sectional areas).

To improve yield of the molding process, each mold block 130 typically comprises a plurality of the mold cavities 146a as perhaps best shown in FIGS. 2 and 4. As perhaps best shown in FIG. 4, the mold cavities 146a arranged in a cavity pattern or array such that the longitudinal axes of the mold cavities 146a are substantially parallel. The pattern or array is optimized for maximum yield of the mold process. FIGS. 2 and 3 illustrates that a through opening 160 is associated with each of the mold cavities, that the through openings 160 are arranged in an opening array, and that the opening array substantially matches the cavity pattern or array when the demolding plate 132 is properly registered relative to the mold block as shown in FIGS. 2, 5, and 6. Further, when the demolding plate 132 is properly registered relative to the mold block, the longitudinal axis of any given through opening 160 is substantially aligned with the longitudinal axis of the mold cavity 146a corresponding to that given through opening 160.

FIG. 2 illustrates that the example transfer plate 134 defines a transfer body 180 and an edge projection 182 extending around a perimeter of the transfer body 180. The example transfer plate 134 defines an outer surface 190, a transfer surface 192, at least one outer edge surface 194, at least one containment surface 196, and at least one perimeter edge surface 198. The example transfer surface 192 has substantially the same dimensions as the support surface 152 of the demolding plate 132. The containment surface(s) 196 are thus configured to closely engage the edge surfaces 154 of the demolding plate 132 when the transfer plate 134 is in a molding configuration relative to the demolding plate 132 as perhaps best shown in FIGS. 5 and 6.

In FIG. 1, the press system 122 and the heat system 124 are shown separate from the mold system 120 for the purposes of clarity. However, it is possible that the transfer plate 134 may form a part of or be integrated into one or both of the press system 122 and the heat system 124. For example, the transfer plate 134 may be attached to a press (not shown), and heating elements (not shown) may be incorporated or embedded into the transfer plate 134. In any configuration, the transfer plate 134 functions to transfer both heat and pressure to the filling material blank 22 during the molding process.

A first example molding process using the first example endodontic body forming system 20 will now be described with reference to FIGS. 2 and 5-8. FIGS. 2 and 5 illustrate that the filling material blank 22 is initially arranged between the support surface 152 of the demolding plate 132 and the transfer surface 192 of the transfer plate 134. FIG. 5 illustrates the mold system 120 in a molding configuration with the filling material blank 22 within a cavity defined by the support surface 152, the transfer surface 192, and the containment surface(s) 196. At that point, the heat system 124 is operated such that a temperature of the filling material blank 22 is within a first pre-molding temperature range of approximately 40° C. to 450° C. and is typically within a second pre-molding temperature range of approximately 5° C. to 250° C.

When the temperature of the filling material blank 22 is within the pre-molding temperature range, filling material blank 22 becomes fluid and the press system 122 and the vacuum system 126 (if used) are operated such that the transfer plate moves in a press direction P (FIG. 6) such that the fluid filling material is forced through the through openings 160 and into the mold cavities 146a as shown in FIG. 6. At this point, the intermediate molded body 26 is formed.

Figure 7:
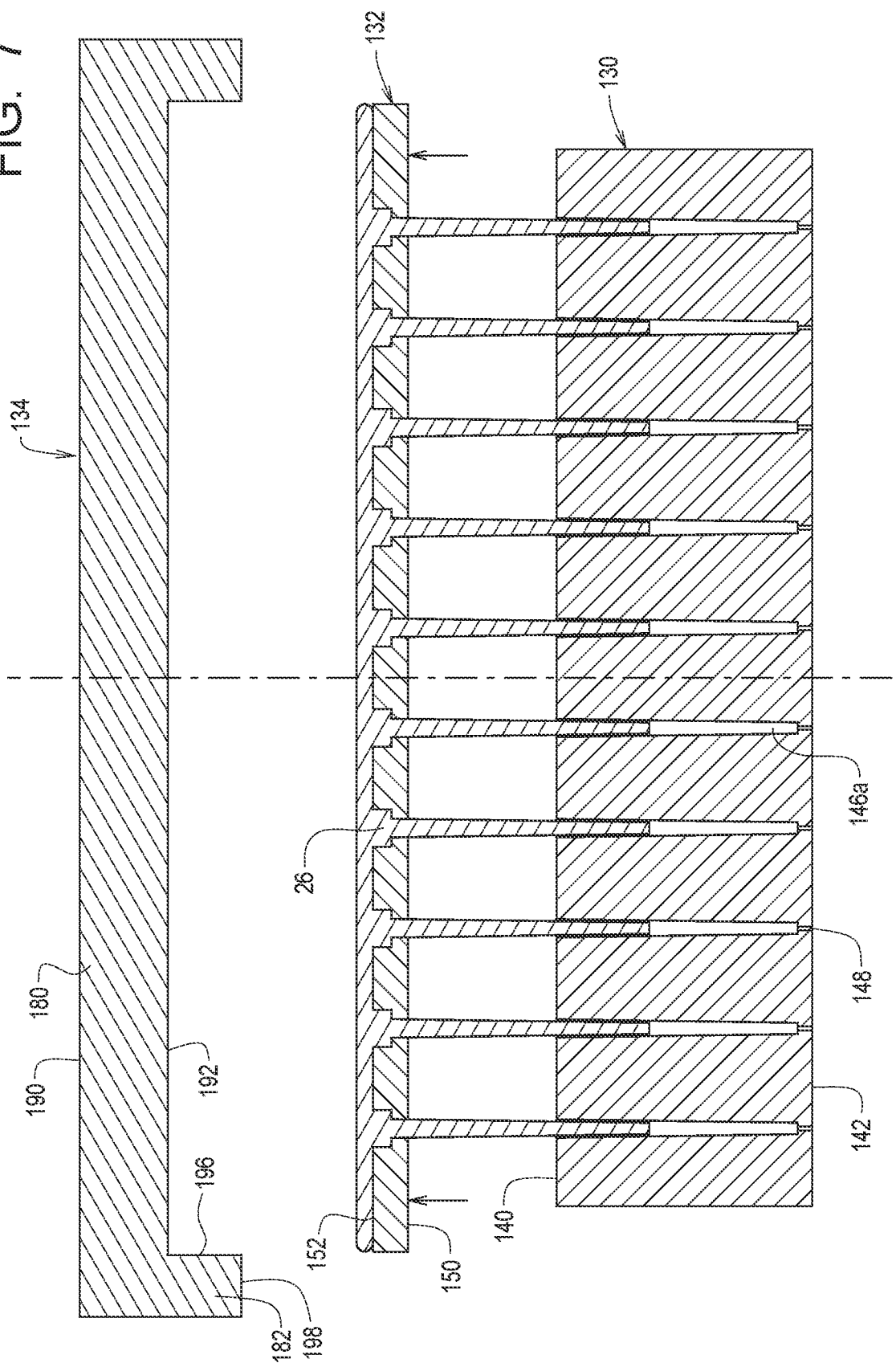

After the intermediate molded body 26 has cooled such that the filling material is no longer fluid, the transfer plate 134 is displaced away from the demolding plate 132 and the demolding plate 132 is displaced away from the mold block 130 as shown in FIG. 7 to remove the intermediate molded body 26 from the mold block 130.

With the intermediate body 26 removed from the mold block 130, the trimming system 128 (FIG. 9) may be used to trim the intermediate body 26 to obtain the endodontic body 24. In the example endodontic forming system 20, the intermediate body 26 is supported by the demolding plate 132 while a blade 128a of the trimming system 128 moves along the press surface 150 of the demolding plate 132 to trim or cut portions of the intermediate body 26 to form the endodontic bodies 24 as shown in FIG. 8. The example trimming system depicted in FIG. 8 comprises a blade arranged to cut the endodontic bodies 24 from the intermediate body 26, but other trimming systems such as milling, grinding, sanding, sawing, or the like may be used in addition or instead. The unused portion of the intermediate body 26 can be reused.

The heat applied to the filling material blanks 22 during the process of using the mold system 120 may be approximately 80° C., is typically within a first preferred range of approximately 50° C. to 1500° C. and in any event should be within a second preferred range of 40° C. to 350° C. The pressure applied to the filling material blanks is typically approximately 100 kg/cm$^2$, is typically within a first preferred range of approximately 10 kg/cm$^2$-500 kg/cm$^2$ in any event should be within a second preferred range of 5 kg/cm$^2$-1000 kg/cm$^2$. If used, the vacuum applied to the fluid ports may be approximately $10^{-1}$ mbar, is typically within a first preferred range of approximately 1000 mbar to $10^{-3}$ mbar, and in any event should be within a second preferred range of $10^{-3}$ mbar to $10^{-11}$ mbar.

The filling material forming the example filling material blank 22 and, after processing using the first example molding process, the example endodontic body 24 typically contains thermal plastic and ceramic fillers. The thermal plastic materials may include, but are not limited to, poly (methyl methacrylate) (PMMA), Acrylonitrile butadiene styrene (ABS), Nylon (polyamides), Polylactic acid (polylactide), Polybenzimidazole (PBI, short for Poly-[2,2'-(m-phenylen)-5,5'-bisbenzimidazole]), Polycarbonate, Polyether sulfone, Polyoxymethylene, Polyetherether ketone, Polyetherimide, Polyethylene, Polyphenylene oxide, Polyphenylene sulfide, Polypropylene, Polystyrene, Polyvinyl chloride, Polyvinylidene fluoride, Teflon, a polyterpene, a polymer of isoprene, polyisoprene, gutta percha, natural polymer, synthesized polymer, or mixtures thereof. The ceramic fillers may include, but are not limited to, metal oxide, salts, glass, silicon carbon, comprise metals, metal salts, metal oxides, hydroxide compounds, non-oxide ceramics, biopolymers, and mixtures thereof. The metal salts include, but not limited to, calcium salts, sodium salts, iron salts, magnesium salts, barium salts, strontium salts, potassium salts, zinc salts, phosphates, carbonate, sulfates, silicates, aluminates, hydrogen salts, and a combination and/or a mixture of thereof. If used, the metal oxides may include, but are not limited to, calcium oxides, sodium oxides, iron oxides, magnesium oxides, barium oxides, strontium oxides, potassium oxides, zinc oxides, zirconium oxide, titanium oxide, tantalum oxides, aluminum oxide, tungsten oxide, bismuth oxide, nickel oxides, cobalt oxides, hafnium oxides, yttrium oxides, silver oxide, gold oxides and a mixture of thereof. If used, the metals may include, but are not limited to, stainless steel, irons, titanium, tantalum, aluminum, tungsten, bismuth, nickel, cobalt, hafnium, yttrium, silver, gold, platinum, alloys, and a mixture of thereof. The non-oxides in PBP may include, but are not limited to, silicon carbide, silicon nitride, borate silicon, titanium nitride, titanium nitride, nitride-oxide titanium, and mixtures thereof. The particle size of [define what is being measured] should be in a first range of approximately 20 nanometer to 50 micrometer and in any event should be within a second range of 1 nanometer to 100 micrometers.

The example mold block 130 is a mono-block containing as many as 5000 mold cavities 146a. The mold cavities 146a of any particular mold block may be the same size and/or may be a variety of sizes as required for dental root canal treatment. The example demolding plate 132 defines through openings or holes 160 having exactly same location (pattern or array) as the mold cavities 146a in the mono-block mold. The size (cross-sectional area or diameter) of the second portions 164 of the through openings 160 of hole is the similar or the same as the size of the mold cavities at the proximal surface 140.

A first example composition of the filling material is as follows:
  a. 40 wt %-60 wt % tantalum oxide (particle size 200 nm-10 um),
  b. 25 wt %-35 wt % Acrylonitrile butadiene styrene (ABS),
  c. 3 wt %-5 wt % wax, and
  d. approximately 1 wt % dispersion agents.

A second example composition of the filling material is as follows:
  a. 20 wt % tungsten oxide powder,
  b. 35 wt % barium sulfate,
  c. 15 wt %-20 wt % Polypropylene,
  d. 10 wt %-15 wt % Polystyrene,
  e. 2 wt %-5% Polyvinyl chloride, and
  f. coupling agents.

A third example composition of the filling material is as follows:
  a. 60.0 wt %-80.0 wt % (particle size 30 nm-100 nm) zirconia powder with surface treatment by coupling agents,
  b. 20.0 wt %-30.0 wt % gutta percha, and
     wt %-3.0 wt % wax.

II. Second Example System and Method for Fabricating Endodontic Bodies

Turning now to FIGS. 10-16 of the drawing, depicted therein is a second example endodontic body forming system 220 of the present invention. The second example endodontic body fabricating system processes the filing material blank 222 (FIGS. 10 and 11) into one or more endodontic bodies 224 as shown in FIGS. 12-16. An intermediate molded body 226 (FIGS. 13 and 14) may be formed during the process of fabricating the endodontic body(s) 224.

Like the first example endodontic body forming system 20, the second example endodontic body forming system 220 may include a mold system 230, a press system 232, a heat system 234, and a trimming system 236. Again, the press system 232, heat system 234, and trimming system 236 are or may be conventional and will not be described herein beyond that extent helpful to a complete understanding of the invention.

The example mold system 230 comprises a first mold block 240 and a second mold block 242. The example first mold block 240 defines a first proximal surface 250, a first distal surface 252, at least one first edge surface 254, at least one first mold surface 256, and at least one first beveled surface 258. The example second mold block 242 defines a second proximal surface 260, a second distal surface 262, at least one second edge surface 264, at least one second mold surface 266, and at least one second beveled surface 268.

The first and second proximal surfaces 250 and 260 are similarly sized and dimensioned. When the first and second proximal surfaces 250 and 260 are brought into contact with the first and second side edges 254 and 264 substantially aligned, mold cavities 270 are formed by adjacent first and second mold surfaces 256 and 266 as shown in FIG. 13. The ends of the mold cavities 270 are open as will be explained in further detail below.

To use the second example endodontic body forming system 220 and the example mold system 230 thereof, the filling material blank 222 is arranged between the first and second mold blocks 240 and 242 as shown in FIGS. 10 and 12. One or both of the first and second mold blocks 240 and 242 are then heated such that the filling material blank 222 becomes plasticized or flowable. The first and second mold blocks 240 and 242 are then forced together as shown in FIG. 13 until the first and second proximal surfaces 250 and 260 come into contact with each other to form the mold cavities 270. During this process, the flowable or plasticized filling material conforms to the shape of the mold cavities 270 to form the intermediate molded body 226. Portions of the intermediate molded body 226 extend out of the open ends of the mold cavities 270 as shown in FIG. 14 and over the beveled surfaces 258 and 268 as shown in FIG. 13.

The intermediate molded body 226 is allowed to cool so that the filling material is no longer plastic or flowable. When the intermediate molded body 226 has sufficiently cooled to be workable with tools, the trimming system 236 is used to trim off parts of the intermediate molded body as shown in FIGS. 15, leaving only the endodontic bodies 224 as shown in FIG. 16. The example trimming system 236 comprises first and second knives 236a and 236b, but other trimming systems such as such as milling, grinding, sanding, sawing, or the like may be used in addition or instead. The unused portion of the intermediate body 226 can be reused.

The temperature and pressure ranges discussed above with reference to the first example endodontic body forming system 20 may be used by the second example endodontic body forming system 220. The filling material forming the filling material blank 222 and endodontic body 224 may be the same as the filling material forming the filling material blank 22 and endodontic body 24 as described above.

In this second example endodontic forming system 220, the plastic/ceramic endodontic bodies 224 for endodontic applications are made by a hot pressing process. The plastic/ceramic filling materials are pre-made sheet shape. The mold for hot pressing is a two half mold. The plastic/ceramic composite sheet is placed on the first half mold and then close second half mold on the top of plastic composite sheet with pressure of 0.1-2000 tons, and temperature of the plastic/ceramic composite is maintained at the temperature at which plastic/ceramic composite softens. The cone shape of endodontic point is successfully made by hot pressing processing.

III. Third Example System and Method for Fabricating Endodontic Bodies

Figure 17:
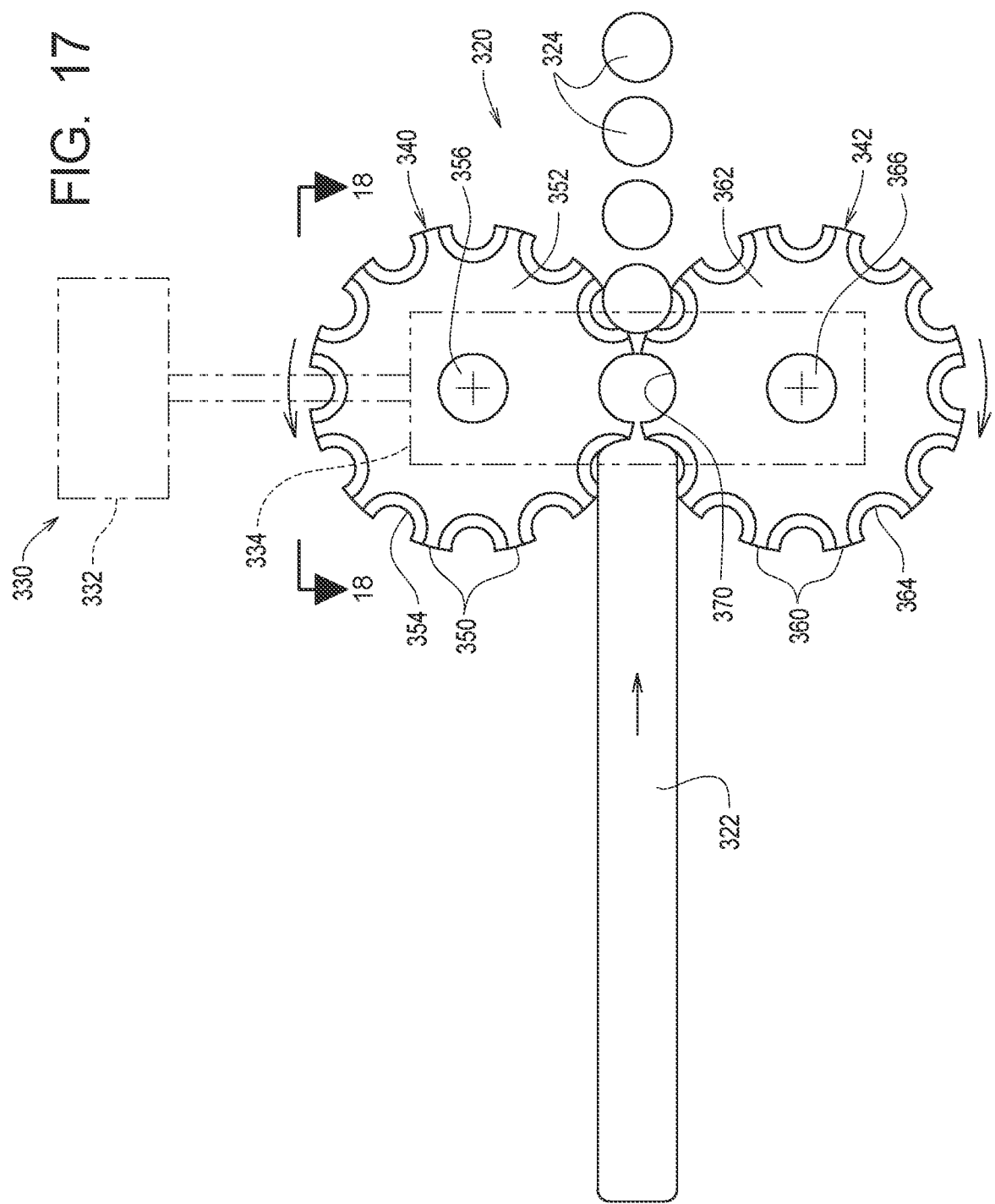
FIG. 17 is a side elevation view illustrating a third example mold system of the present invention in a first position.

Turning now to FIGS. 17-19 of the drawing, depicted therein is a third example endodontic body forming system 320 of the present invention. The third example endodontic body fabricating system processes the filing material blank 322 into one or more endodontic bodies 324 as shown in FIGS. 17 and 19.

Like the first and second example endodontic body forming systems 20 and 220, the second example endodontic body forming system 320 may include a mold system 320, a press system 322, and a heat system 324. Again, the press system 322 and heat system 324 are or may be conventional and will not be described herein beyond that extent helpful to a complete understanding of the invention.

The example mold system 320 comprises a first mold roller 340 and a second mold roller 342. The example first mold roller 340 defines a first outer surface 350, a pair of first end surfaces 352, at least one mold surface 354, and at least one axle portion 356. The example second mold roller 342 defines a second outer surface 360, a pair of second end surfaces 362, at least one mold surface 364, and at least one axle portion 366.

The first and second outer surfaces 350 and 360 are similarly sized and dimensioned. When the first and second outer surfaces 350 and 360 are brought into contact with the first and second end surfaces 352 and 362 substantially aligned, mold cavities 370 are formed by adjacent first and second mold surfaces 354 and 364 as shown in FIGS. 17 and 19. The ends of the mold cavities 370 may be open.

To use the second example endodontic body forming system 320 and the example mold system 330 thereof, the filling material blank 322 is arranged between the first and second mold rollers 340 and 342 while the rollers 340 and 342 are rotated about their axel portions as shown in FIGS. 17 and 19. One or both of the first and second mold rollers 340 and 342 are simultaneously heated such that the filling material blank 322 becomes plasticized or flowable when in contact with the rollers 340 and 342. An additional heater may be provided to heat the filling material blank 322 before it comes into contact with the rollers 340 and 342.

At the same time, the first and second mold rollers 340 and 342 are forced or held together as shown in FIG. 17 such that the first and second outer surfaces 350 and 360 come into contact with each other and successive mold surfaces 354 and 364 are aligned to form the mold cavities 370. During this process, the flowable or plasticized filling material conforms to the shape of the mold cavities 370 to form the endodontic bodies 324. Portions of the intermediate molded body may extend out of open ends of the mold cavities 370, or the size of the filling material blank 322 may be predetermined such that the mold cavities are completely filled with no excess material.

The endodontic bodies 324 are gently displaced from the mold cavities and allowed to cool so that the filling material is no longer plastic or flowable.

In this third example endodontic body forming system 320, the plastic/ceramic endodontic body for endodontic applications are made by hot rolling processing. The plastic/ceramic composite sheet was passed through between two rotated metal cylinders with a half of a cone mold at a temperature at which the filling materials soften. The cone materials can be produced quickly and uniformly.

IV. Additional Considerations

In general, dental root canals are not standard the cone shapes. Multiple and irregular shapes can easily be designed and made by the hot press processes described herein.

In another aspect of the present invention, the flowability of the thermoplastic/ceramic composite may be improved by controlling the particle size distribution of the solid components in the composite. The particle size of the solid filler is suitably in the range from about 0.001 micrometer to about 1000 micrometers and preferably in the range from about 0.01 micrometer to about 50 micrometers.

Also, organic dispersant agents (coupling agents) may be introduced into composite to improve the stability and injectability of the paste, including, but not limited to, citric acid, sodium citrate, celluloses, hydroxypropyl methyl cellulose, polyacrylic acids, carbonylmethyl cellulose, biopolymers, organic acids, and mixtures of thereof.

The plastic/ceramic composite for endodontic applications in accordance with the present invention can be prepared by physical mixing processes (nonreactive), chemical processes (reactive), biological processes, and combinations thereof.

In another aspect of present invention, the bioactive coatings are deposited on surface of plastic/ceramic endodontic body for improving the bioactivity, biocompatibility, and/or anti-bacteria properties. The coatings for plastic/ceramic endodontic body include, but are not limited to, calcium silicate, di-calcium silicate, tricalcium silicate, nano sliver, calcium phosphate, bioactive agents, anti-bacteria agents, and mixtures of thereof.

The coating process may include, but is not limited to, spray coating, dip coating, ultrasonic spray coatings, sol-gel coating, composite coating and a mixture of thereof.

What is claimed is:

1. A method of making an endodontic body comprising the steps of:
   providing a filling material blank comprising filling material suitable for endodontic applications, the filling material comprising thermal plastic material and ceramic material;
   providing a mold system comprises first and second mold blocks defining at least one mold cavity, where at least a portion of the mold cavity is in the shape of the endodontic body;
   arranging the filling material blank adjacent to the at least one mold cavity;
   applying heat to the filling material blank such that the filling material blank is deformable; and
   applying pressure to the heated filling material blank such that at least a portion of the heated material blank flows into the at least one mold cavity.

2. A method as recited in claim 1, in which the step of providing the mold system comprises the steps of:
   providing a demolding plate defining at least one through opening;
   arranging the demolding plate such that the at least one through opening is adjacent to the at least one mold cavity such that at least a portion of the heated material blank flows into the at least one mold cavity through the at least one through opening; and
   displacing the demolding plate away from the mold block.

3. A method as recited in claim 2, in which the step of providing the mold system further comprises the steps of:
   providing a transfer plate; and
   arranging the filling material blank between the transfer plate and the demolding plate.

4. A method as recited in claim 1, in which:
   the step of providing the mold system comprises the steps of
      providing the first mold block such that the first mold block defines at least one first mold surface;
      providing the second mold block such that the second mold block defines at least one second mold surface;
   the step of arranging the filling material blank adjacent to at least one of the first and second mold cavities comprises the step of arranging the at least one filling material blank between the first and second mold blocks;

the step of applying pressure to the heated filling material blank comprises the step of forcing the first and second mold blocks together such that the at least one first mold surface and the at least one second mold surface define the at least one mold cavity.

5. A method as recited in claim 1, in which:
the step of providing the mold system comprises the steps of:
  providing a first mold roller defining at least one first mold surface;
  providing a second mold roller defining at least one second mold surface;
the step of arranging the filling material blank adjacent to the at least one mold cavity comprises the step of displacing the at least one filling material blank between the first and second mold rollers;
the step of applying pressure to the heated filling material blank comprises the step of forcing the first and second mold rollers together such that the at least one first mold surface and the at least one second mold surface define the at least one mold cavity.

6. A method as recited in claim 1, in which the filling material comprises at least one of Polyphenylene sulfide, Polypropylene, Polystyrene, Polyvinyl chloride, Polyvinylidene fluoride, Teflon, a polyterpene, a polymer of isoprene, polyisoprene, gutta percha, natural polymer, synthesized polymer, and mixtures thereof.

7. A method as recited in claim 1, the filling material comprises at least one of metal oxide, salts, glass, silicon carbon, metals, metal salts, hydroxide compounds, non-oxide ceramics, biopolymers, and mixtures thereof.

8. An endodontic body forming system for making an endodontic body from a filling material blank comprising filling material suitable for endodontic applications comprising:
  a mold system comprising at least first and second mold members defining at least a portion of a mold cavity, where at least a portion of the mold cavity is in the shape of the endodontic body;
  a press system; and
  a heating system; wherein
  the filling material blank comprises filling material comprising thermal plastic material and ceramic material;
  when the filling material blank is arranged adjacent to the at least one mold cavity, the heat system applies heat to the filling material blank such that the filling material blank is deformable; and
  when the filling material blank is heated, the press system applies pressure to the heated filling material blank such that at least a portion of the heated material blank flows into the at least one mold cavity.

9. An endodontic body forming system as recited in claim 8, in which the at least first and second mold members comprise a mold block defining the at least one mold cavity, the mold system further comprising:
  a demolding plate defining at least one through opening; wherein
  the demolding plate is arranged such that the at least one through opening is adjacent to the at least one mold cavity such that at least a portion of the heated material blank flows into the at least one mold cavity through the at least one through opening; and
  the demolding plate is displaced away from the mold block to remove the endodontic body from the mold.

10. An endodontic body forming system as recited in claim 8, further comprising a transfer plate, wherein the filling material blank is arranged between the transfer plate and the demolding plate.

11. An endodontic body forming system as recited in claim 8, in which the at least first and second mold members comprise a first mold block defining at least one first mold surface and a second mold block defining at least one second mold surface, wherein, when the at least one filling material blank is arranged between the first and second mold blocks the first and second mold blocks are forced together such that the at least one first mold surface and the at least one second mold surface define the at least one mold cavity.

12. An endodontic body forming system as recited in claim 8, in which the at least first and second mold members comprise a first mold roller defining at least one first mold surface and a second mold roller defining at least one second mold surface, wherein, when the at least one filling material blank is displaced between the first and second mold rollers, the first and second mold rollers are forced together such that the at least one first mold surface and the at least one second mold surface define the at least one mold cavity.

13. An endodontic body forming system as recited in claim 8, in which the filling material comprises at least one of Polyphenylene sulfide, Polypropylene, Polystyrene, Polyvinyl chloride, Polyvinylidene fluoride, Teflon, a polyterpene, a polymer of isoprene, polyisoprene, gutta percha, natural polymer, synthesized polymer, and mixtures thereof.

14. An endodontic body forming system as recited in claim 8, in which the filling material comprises at least one of salts, glass, silicon carbon, metals, metal salts, metal oxides, hydroxide compounds, non-oxide ceramics, biopolymers, and mixtures thereof.

15. A method of making an endodontic body comprising the steps of:
  providing a filling material blank comprising filling material suitable for endodontic applications;
  providing a mold system defining at least one mold cavity, where at least a portion of the mold cavity is in the shape of the endodontic body, where the step of providing the mold system comprises the steps of
    providing a first mold block defining at least one first mold surface, and
    providing a second mold block defining at least one second mold surface;
  arranging the filling material blank adjacent to the at least one mold cavity, where the step of arranging the filling material blank adjacent to the at least one mold cavity further comprises the step of arranging the at least one filling material blank between the first and second mold blocks;
  applying heat to the filling material blank such that the filling material blank is deformable; and
  applying pressure to the heated filling material blank such that at least a portion of the heated material blank flows into the at least one mold cavity, where the step of applying pressure to the heated filling material blank comprises the step of forcing the first and second mold blocks together such that the at least one first mold surface and the at least one second mold surface define the at least one mold cavity.

16. A method of making an endodontic body comprising the steps of:
  providing a filling material blank comprising filling material suitable for endodontic applications;
  providing a mold system defining at least one mold cavity, where at least a portion of the mold cavity is in the shape of the endodontic body, where the step of providing the mold system comprises the steps of
providing a first mold roller defining at least one first mold surface;
providing a second mold roller defining at least one second mold surface;
arranging the filling material blank adjacent to the at least one mold cavity, where the step of arranging the filling material blank adjacent to the at least one mold cavity comprises the step of displacing the at least one filling material blank between the first and second mold rollers;
applying heat to the filling material blank such that the filling material blank is deformable; and
applying pressure to the heated filling material blank such that at least a portion of the heated material blank flows into the at least one mold cavity, where the step of applying pressure to the heated filling material blank comprises the step of forcing the first and second mold rollers together such that the at least one first mold surface and the at least one second mold surface define the at least one mold cavity.

17. An endodontic body forming system for making an endodontic body from a filling material blank comprising filling material suitable for endodontic applications comprising:
a mold system comprising at least one mold member defining at least a portion of a mold cavity, where
at least a portion of the mold cavity is in the shape of the endodontic body, and
the at least one mold member comprises a first mold block defining at least one first mold surface and a second mold block defining at least one second mold surface;
a press system; and
a heating system; wherein
when the filling material blank is arranged adjacent to the at least one mold cavity, the heat system applies heat to the filling material blank such that the filling material blank is deformable;
when the filling material blank is heated, the press system applies pressure to the heated filling material blank such that at least a portion of the heated material blank flows into the at least one mold cavity; and
when the at least one filling material blank is arranged between the first and second mold blocks the first and second mold blocks are forced together such that the at least one first mold surface and the at least one second mold surface define the at least one mold cavity.

18. An endodontic body forming system for making an endodontic body from a filling material blank comprising filling material suitable for endodontic applications comprising:
a mold system comprising at least one mold member defining at least a portion of a mold cavity, where
at least a portion of the mold cavity is in the shape of the endodontic body, and
the at least one mold member comprises a first mold roller defining at least one first mold surface and a second mold roller defining at least one second mold surface;
a press system; and
a heating system; wherein
when the filling material blank is arranged adjacent to the at least one mold cavity, the heat system applies heat to the filling material blank such that the filling material blank is deformable;
when the filling material blank is heated, the press system applies pressure to the heated filling material blank such that at least a portion of the heated material blank flows into the at least one mold cavity; and
when the at least one filling material blank is displaced between the first and second mold rollers, the first and second mold rollers are forced together such that the at least one first mold surface and the at least one second mold surface define the at least one mold cavity.

* * * * *